United States Patent [19]

Oestreich

[11] Patent Number: 4,586,327
[45] Date of Patent: May 6, 1986

[54] SZ STRANDING METHOD AND APPARATUS

[75] Inventor: Ulrich Oestreich, Munich, Fed. Rep. of Germany

[73] Assignee: Siemens Aktiengesellschaft, Berlin & Munich, Fed. Rep. of Germany

[21] Appl. No.: 699,951

[22] Filed: Feb. 8, 1985

[30] Foreign Application Priority Data

Feb. 9, 1984 [DE] Fed. Rep. of Germany ....... 3404638

[51] Int. Cl.⁴ ................ D07B 3/00; H01B 13/04; G02B 5/14
[52] U.S. Cl. .......................................... 57/294; 57/6; 57/293
[58] Field of Search ............. 57/3, 6, 7, 9, 16–18, 57/293, 294, 314

[56] References Cited

U.S. PATENT DOCUMENTS

| | | | |
|---|---|---|---|
| 3,884,024 | 5/1975 | Oestreich et al. ...................... | 57/294 |
| 4,196,576 | 4/1980 | Vogelsberg ............................ | 57/294 |
| 4,207,928 | 6/1980 | Pershin et al. ..................... | 57/294 X |
| 4,214,430 | 7/1980 | Vogelsberg et al. ..................... | 57/6 |
| 4,359,857 | 11/1982 | Oestreich . | |
| 4,528,810 | 7/1985 | Vogelsberg ............................ | 57/294 |

Primary Examiner—Donald Watkins
Attorney, Agent, or Firm—Hill, Van Santen, Steadman & Simpson

[57] ABSTRACT

A method and apparatus which enables stranding a skein-like element with reduced backtwist characterized by a stranding nipple, a tubular store having an axis, means for rotating the tubular store on its axis in both a first and second rotational direction and means for moving the tubular store longitudinally along its axis as it is being rotated. The change in direction of rotation is selected to occur during displacement from an initial position spaced from the stranding nipple to a final position adjacent the stranding nipple so that during a first portion of a cycle, lays are accumulated on the tubular store then with reversing of the rotating direction, the lays are decreased and finally during a third portion of the cycle the tubular store is shifted from the final position back to the first position for repeating the cycle.

28 Claims, 4 Drawing Figures

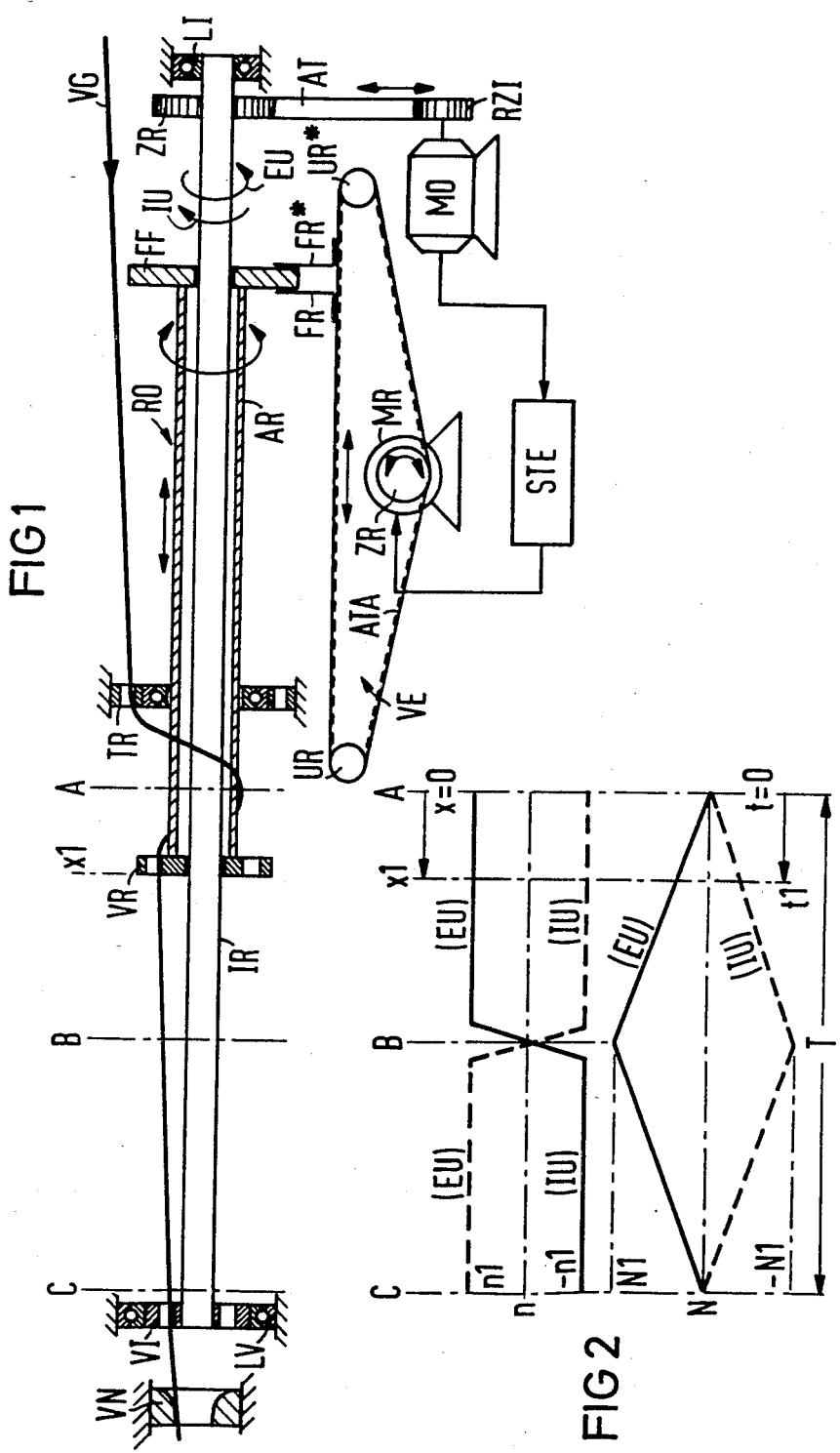

SZ STRANDING METHOD AND APPARATUS

BACKGROUND OF THE INVENTION

The present invention is directed to an SZ stranding method for skein-like stock which is conducted along an outside surface of a tube store, which has a longitudinal axis and is alternately rotated in a first direction and then a second direction on its axis, with a changing number of lays and then through a stranding nipple. In addition, the invention is directed to an improved stranding apparatus which performs the improved method.

Stranding of stranding stock, particularly in the form of electrical and/or optical conductors, by means of a tube store is known, for example, from U.S. Pat. No. 4,359,857, which claims priority from German Patent application No. 30 06 055. As disclosed in this U.S. patent, a tube store having a tubular guidance storage member is provided and one end carries a stranding disk or plate which is rigidly connectd thereto. The stranding stock is moved along the tubular store and through the stranding disk to pass through a stranding nipple. A known SZ stranding can be obtained by means of periodically changing a rotational direction of the rotation of the tube store on its axis.

A more precise examination of the operating mode of a known tube store apparatus or machine shows that a combination of sliding movement or translation and stranding upon roll-off of the stranding stock on the tube store occurs during the stranding operation. The combination of the translation and of the rotation or roll-off in a common pass leads to a certain limitation of the use possibilities of such a stranding method. Specifically, difficulties can occur when stranding elements having a high outer coefficient of friction or when a demand is made for a tube diameter in relation to the tube length and the respective number of lays mutually restrict one another. Moreover, depending on the relationship of the speed of rotation of the store and the stranding speed, the method always leads to a more or less complete backtwist, which is usually desirable given round elements but can be undesirable given profiled elements, for example, sector leads or cables which have a number of elements with the spacing or the gore filled. However, it is still desirable to have an SZ stranding for these types of elements.

SUMMARY OF THE INVENTION

The object of the present invention is to provide a method and apparatus utilizing a tubular store to obtain SZ stranding in which it is possible to separate the sliding or translational movement and the stranding or rotation during a stranding operation from one another at least to a certain degree and to thereby increase the number and quality of use for the stranding method and apparaus.

To accomplish this task, the present invention is directed to an improvement in a method of SZ stranding for a skein-like stock by providing a stranding nipple and a tubular store having an axis, alternately rotating the tubular store on its axis in a first direction and then a second direction, and conducting the stock along the outside of the tubular store with a changing lay number as the stock moves through the stranding nipple. The improvements comprising preventing the accumulation of backtwist on the stock by moving the tubular store along an axial direction from an initial position through a center point to a final position closely adjacent the stranding nipple in a cycle having three steps or portions with the first step of the cycle being moved from the initial position to the midpoint or center point and rotating the tubular store in one of the first and second directions to accumulate lays on the tubular store; the second step including reversing the direction of rotation of the tube to the other of the first and second directions as the tube reaches the midpoint of the travel to start to decrease the number of lays accumulated on the tubular store as it moves axially toward the final position and the third step being upon reaching the final position quickly shifting the tubular store in the opposite axial direction to the initial position to repeat the cycle.

The stranding operation of the present invention does not occur with an axially stationary tube store. However, the tube store is moved in a longitudinal and axial direction during the accumulation and removal of the stranding stock so that in other words, the available length on which the stranding stock can be applied with the lays changes during the stranding operation because of a traveling store. This has the advantage that the forward motion of the stranding stock occurs without sliding movement on the tube store and the diameter of the tube store is only limited by its inert mass. All the more lays can be accumulated on the tube the larger the tube diameter.

Since in the second step, the rotational sense or direction of the tube store is reversed upon continuation of the longitudinal movement, the number of lays on the tube store will decrease and approach zero at the end of the second step. For example, there are no longer practically any stranding lays on the tube store at the end of the first pass in the longitudinal direction. It is thereby possible to actually return the tube store from the final position back to the initial position in a rapid motion without the stranding stock being negatively affected by this movement of the store.

Since the invention works with different lengths of tube stores, the allocation of the length and number of lays can be freely selected. A particular advantage of the method lies in the fact that the elements of the skein-like stock are indeed twisted at first but are again untwisted when reversing the stranding direction before passing through the stranding disk so that only the normal torsional movement has to be exerted at the end when passing the stranding disk. Here the twisting machines must restrand from one torsional direction into the other or second direction so that far more than the normal torsional movement must be exerted. Over and above this, the reversing locations become far longer due to the lack of stranding disks therein.

The invention also relates to an apparatus for implementation of the stranding method and is directed as an improvement to a stranding apparatus having a stranding nipple, a tubular store having an axis aligned with the axis of the stranding nipple, and means for rotating the tubular store in alternate directions about its axis during a stranding operation. The improvements are providing means for longitudinally displacing the tubular store along its axis from an initial position spaced from the stranding nipple to a final position adjacent the stranding nipple and then reversing the direction of movement to rapidly move from the final position back to the initial position. Thus, the invention utilizes a variable-length tube store system that is movable in a longitudinal direction and provides a traveling store.

Other advantages and structural features will be readily apparent upon reviewing the specification, drawings and attached claims.

BRIEF DESCRIPTION OF THE DRAWINGS

FIG. 1 is a longitudinal cross-sectional view with portions in elevation of a stranding apparatus for implementing the method in accordance with the present invention;

FIG. 2 is a time diagram for execution of the rotation and longitudinal displacement in accordance with the present invention;

DESCRIPTION OF THE PREFERRED EMBODIMENTS

Figure 4:
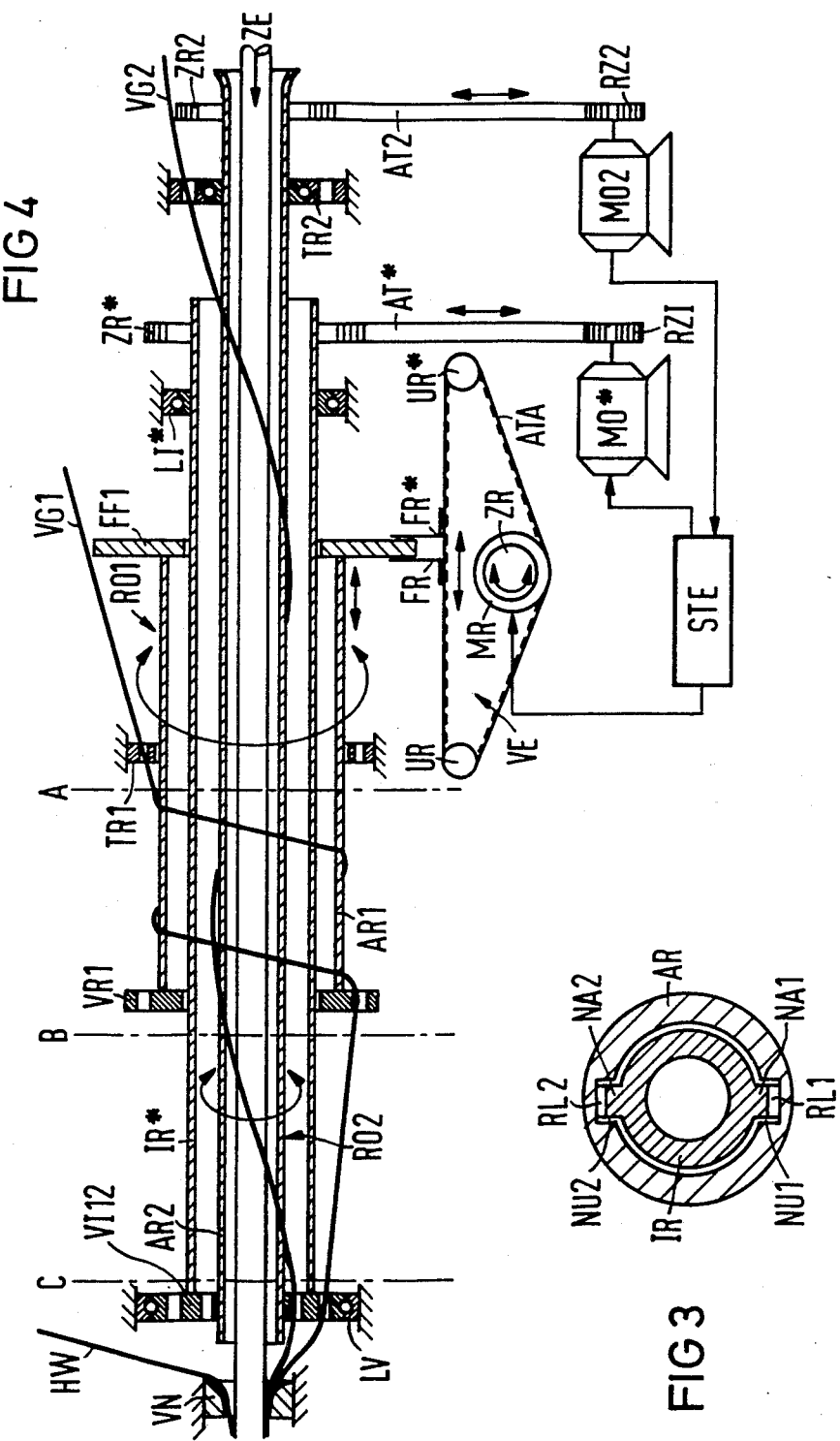
FIG. 4 is a longitudinal cross-sectional view with portions in elevation of another embodiment of a stranding device in accordance with the present invention.

The principles of the present invention are particularly useful when incorporated in a stranding apparatus illustrated in FIG. 1. In the apparatus of FIG. 1, a stranding stock VG, which is preferably in the form of an electrical lead (or a group of leads under given conditions) or of a light waveguide, is drawn from a feed reel (not shown) and reaches a stranding nipple VN at the end of the stranding operation, whence the haul-off (not shown in detail here) follows with, under certain conditions, a retaining helical spinner which is then followed by a bundling device, a cladding device and a drum for accumulating the stranded material. A tube store or tubular store RO is provided for stranding with different stranding directions to provide an SZ stranding. The tube store RO comprises a tubular guide member AR serving the purpose of storage and is referred to as an outer tube. A stranding disk VR is rigidly attached to the left end of the outer tube AR and has corresponding guide holes for the stranding stock which guide rolls are distributed over the circumference thereof in a circular arrangement. It should be pointed out that a larger plurality of skeins of stranding stock are present but only a single one has been shown here in order to simplify the drawing.

A stationary distributor disk TR is also present and this is located upstream of the stranding disk VR as seen in the working direction which goes from right to left in FIG. 1. The stationary disk TR likewise is provided with bores lying in an annular arrangement through which the stranding stock VG passes. In the present case, the stationary distributor disk TR is simultaneously employed as a bearing for the tube store RO or, respectively, for the outer tube part AR. For this purpose, a bearing such as a ball bearing with a sliding sleeve is provided on the inside of the distributor disk TR and it allows sliding engagement between the tube AR and the bearing. It would also be possible to provide a sliding guide or the like. At any rate, the frictional forces should be kept low at this location. As seen in the stranding direction, a guide flange FF is rigidly connected to the outer tube AR at the other or right end of the tube store RO upstream of the stranding disk VR. This guide flange FF, which rotates with the tube store RO, lies between two guide angles or flanges FR and FR* which belongs to a displacement means VE. The displacement means VE is composed of a drive ATA conducted over deflection rollers UR and UR*. The drive ATA is, for example, in the form of a tooth belt, and has an upper part or path that proceeds roughly parallel to the longitudinal direction of the axis of the tube store RO. The drive ATA can be moved in two respective opposite directions by means of a motor MR wherein the motor engages the drive means ATA which is designed as a toothed belt by means of a pinion ZR. Dependent on the rotational direction of the motor MR, it is thus possible to axially displace the tube store RO toward the left or toward the right.

The apparatus of FIG. 1 also has means for rotating the tube store RO on its axis in either a first direction which may be a counterclockwise direction or a second direction which may be clockwise direction. The means for rotating includes a motor MO, which, for example, has a pinion RZI which drives a tooth belt AT which engages a gear wheel ZR of an inner tube or member IR of the tube store RO. The inner member IR extends concentrically within the outer tube AR and is provided at one end with a bearing LI to support it in a frame of the stranding device or apparatus. The gear wheel ZR is adjacent to the bearing LI. At an opposite end, the member IR is rigidly connected to a stranding disk VI which is rotatably seated on its outside by a bearing LV which is supported in the stranding frame. With respect to the position of its throughbores, the stranding disk VI expediently has the same diameter as the stranding disk VR of the tube store RO.

However, it is also possible to reduce the diameter of the stranding disk VI with the maximum reduction being nearly down to the diameter of the inner tube IR. Expediently, however, the stranding disks VI and VR have their corresponding openings in alignment so that the stranding stock VG proceeds on a straight line in the region between the two disks. Downstream of the stranding disk VI, the stranding stock proceeds to the stranding nipple VN and is processed further after passing therethrough in a known fashion, for example, by providing a retaining helix and by winding on a drum such as illustrated in the above-mentioned patent.

The allocation between the outer tube AR of the store RO and the inner tube IR is arranged so that the outer tube AR is longitudinally displaceable relative to the inner tube IR and can be displaced in a direction toward the stranding disk VI. Further, the outer tube AR executes the same rotational movement as the inner tube IR so that the two stranding disks VR and VI also rotate in synchronization with one another. The stranding stock VG proceeds on a straight line through air between the two stranding disks VR and VI and thus no torsion or twisting will occur therebetween.

Figure 3:
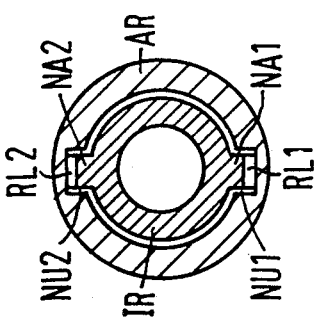
FIG. 3 is a transverse cross-sectional view of the longitudinal tubular store in accordance with the present invention.

As best illustrated in FIG. 3, the structure of the outer tube AR and of the inner tube IR is such that the inner tube IR comprises two elongated longitudinally extending noses or ribs NA1 and NA2 on its outer circumference which are guided in corresponding longitudinal grooves NU1 and NU2 which are provided on the inside of the outer tube AR of the tube store RO. The longitudinal displacement of the outer tube AR relative to the inner tube or member IR is thus possible. In order to be able to execute this longitudinal displacement with an optimally low friction, rollers RL1 and RL2 are disposed between the noses NA1 and NA2 and the base of the grooves NU1 and NU2 respectively. Any and all of the rotational movement of the inner tube IR is also transmitted largely play-free onto the outer tube AR as a consequence of the engagement of the noses NA1 and NA2 in their respective grooves NU1 and NU2. These ribs and grooves form a splined connection between the member IR and tube AR.

A control means STE is provided for controlling the longitudinal motion of the tubular store RO. It accepts position signals either from the motors MO driving the single store or the motor MO2 driving the inner store. The means STE controls the synchronism of MO and MO2 and in both cases makes the longitudinal motion of AR or AR1 respectively happen in the right manner at the right time. That can be done by means of simple processor logics. The position signals of MO or MO2 respectively are produced by a conventional position (angle) coding device. Instead of a drive with the stranding disks VI and VR via the inner tube IR, an external drive can also be provided, for example, via an elongated gear wheel which is driven by a motor and engages both the stranding disk VI and VR on their outer rims which have been provided with rim gears. Instead of the inner member IR, an arbitrary longitudinal guidance for the storage tube RO would suffice in this case.

The operation of the device and execution of the improvement of the stranding process will be described in greater detail with reference to FIGS. 1 and 2. In FIG. 1, an initial position A is shown in chain lines at a point slightly to the right of the stranding disk VR. A final position C is illustrated as being adjacent the stranding disk VI and an intermediate or midpoint B is positioned partly therebetween.

In FIG. 2, two diagrams are present. One shows speed and direction of rotation ±M in relationship to time T which is directly proportional to displacement x. The other shows the number of lays ±N in relationship to time T. The hold lines are for a first pass or advance of a first cycle and the broken lines are for the second advance of the following cycle.

At the start of a cycle, which is being described, the stranding disk VR is positioned at the initial position A and this is considered at time t=0 and displacement x=0. The inner tube IR and thus the outer tube AR of the tube store RO are rotated with a speed +nl in a counterclockwise direction EU as seen from the right. At time t=0, the motor MO is running and the motor MR of the displacement means VE is activated, namely, such that the tube store RO is moved toward the left with the haul-off speed. At a displacement by the quantity xl proceeding from the initial position A, i.e., at time tl, the tube store RO reaches the position shown in the drawings wherein in the present example, the lay number, i.e., the number of lays of the stranded stock VG on the tube store RO roughly corresponds to the value 1. Given an increased passage of time and at the same time an increasing displacement of the tube store RO toward the left, the value of x becomes higher and higher and the lay number N likewise increases, namely, up to a point at roughly the midpoint B where the lay number assumes the maxium value Nl. Shortly berfore the midpoint B is reached, the rotational sense or direction is reversed. This occurs by means of reversing the reversible motor MO and thus the tube store OR will be reversed to a clockwise direction IU. The maximum speed of rotation in the clockwise direction IU is reflerenced −nl. Since after exceeding or passing the midpoint or region B, the rotation of the tube store RO now occurs in the reverse direction opposite to the direction of rotation while traveling from point A to B, the lay number now continuously decreases from the maximum value +Nl, which is attained at midpoint B and reaches approximately the value 0 when the stranding disk VR arrives at the final point C. The final point C is spatially disposed as close to the second stranding disk VI as possible. The number of lays N on the tube store RO thus changes according to the triangular function given the forward feed.

Since the lay number N on the tube store RO has likewise reached approximately the value 0 in the meantime, it is possible without complication to return the tube store RO to the initial position A in a reset motion that is as sudden and as fast as possible and to thus prepare for a new cycle of steps in the same fashion as described above. This motion sequence of resetting from the final position C to the initial position A should be executed as quickly as possible for which reason the motor MR must be capable of being placed in motion and stopped with a corresponding clarity. Motors which are reversible with corresponding speeds are available and preferably stepping motors are expediently employed.

When, upon return of the tube store RO from the final position C to the initial position A, the rotational motion of the inner tube IR is not stopped or interrupted. Thus, this is innocuous particularly when the rotational motion proceeds such that it leads to a stranding of the last lay on the tube store RO up to the end of the return motion. The reset motion should thus expediently commence shortly before the store content is completely emptied depending on the velocity and on the rotational speed.

The time required for the return of the tube store RO from the final position C to the initial position A should be kept as short as possible, namely, compared to the time T required for the forward motion during which the stranding can be executed or, respectively, the stranding stock is applied with lay to the tube store RO. This return time on the tube store RO should correspond to at most one store revolution, for example, given a ±5 lays on the tube store RO, the time required for the third step or return lies at one-tenth of the time T expended for the first and second steps. This time preferably lies in a range between one-sixth and one-fifteenth of the time to travel from the initial point A to the final point C, i.e., between one-sixth and one-fifteenth of an advance time T.

The reversing point at the midpoint B for the stranding direction expediently lies approximately in the center between the starting or initial point A and the final point C. However, it is also possible to travel with different increasing or, respectively, decreasing rotational speeds for the individual regions under given conditions whereby point B would no longer lie at the center distance between the initial point A and the final point C.

After the conclusion of the first advance from right to left, the second advance begins after the return to the initial position A. In order to avoid a reverse of the rotational direction therein, the second advance begins with the rotational direction −nl, i.e., clockwise direction IU which was the rotational direction existing at the end of the first advance. In contrast thereto, the second advance ends with the rotational sense +nl, i.e., a counterclockwise direction. Accordingly, the lay numbers have a maximum Nl for the counterclockwise direction EU during the first advance and the lay numbers become a maximum −Nl for the clockwise direction IU during the second advance.

The dimensions for the machine or apparatus for the stranding cables such as rubber-coated leads can be advantageously selected as follows:

n1 = 300 rpm = 5 rps.

Length of the path $\overline{AC}$ = 2 m,

Length of the lay 25 cm (in the bundle; lead diameter ≃15 mm),

Traveling store: active length 1 m (overall 1.5 m),

Overall length of the stranding machine: ≃4 m,

Lay number on the tube store: ± lays (i.e., 8 lays in the finished cable between two reversing locations), Rate of advance of the tube store:

2 m in $\frac{8}{300}$ min. = 1.6 sec ≙

1 m/0.8 sec. = 1.25 m/sec. 75 m/min.,

Maximum return time $\frac{0.25}{1.25}$ = 0.2 sec. (during one revolution),

Reversing time for rotational change from +300 to −300 rpm: approximately 0.1 second.

With respect to the control sequence and the motional events, symmetrical sequences, i.e., uniform speed for the longitudinal displacement of the tube store RO and the reversing point B of the rotational sense or direction in the center between A and C, is the best solution. However, it is also possible to allow the point B to migrate back and forth in oscillating fashion, i.e., to respectively change the length of the lays for the individual stranding directions and/or lay numbers. Such measures can be advantageous when value is placed on differing or varying coupling conditions when stranding electrical leads or, respectively, the individual reversing points should have different spacings from one another.

It is also possible to conduct a central element through the inside of the inner tube IR in a fashion not shown here. This inner element is conducted through the corresponding enlarged bore of the stranding nipple VN and stranding stock VG is thus stranded thereon. For example, this central element can be an inner bundle or a tensile element or the like.

In many instances, it is expedient or necessary to simultaneously strand a plurality of plies or to apply different types of stranding stock in different plies or combinations. Such problems can occur, for example, when high voltage electrical cables and lines or coaxial cables must be stranded. It is thereby demanded that a stranding with a backtwist should occur for the main leads (with the exception of sector-shaped leads). A normal tube store machine, which comprises a store driven from behind, can be used for this purpose. In the same time, however, cables having filled spaces between the individual elements of the cable and with a preform profile may, for example, also have to be co-stranded in the same process and without backtwist. A normal tube store is thus less suitable for such purpose because of its unwinding effect and given a sliding engagement of the tube store would also generate too many frictional forces and frictional forces that are too high because the cables having the filled inner spaces are usually rubber-like. It was heretofore necessary to utilize a cage strander for this purpose. However, cage stranders are more involved than tube store machines or devices.

An embodiment of the stranding apparatus in accordance with the present invention is illustrated in FIG. 4 and shows how different demands can be met in a simple fashion with very good results utilizing a single stranding apparatus comprising two tube stores. The stranding apparatus shown herein comprises an axially displaceable tube store RO1, which is equipped with a stranding disk VR1 at one end and a guide flange FF1 at the opposite end. The tube store RO1 also coacts with a stationary distribution disk TR1. These elements have the same structure except for the diameter as the parts of the stranding device illustrated in FIG. 1 and are referenced with the same letter combinations. In addition, a displacement means VE which comprises the drive motor MR, a drive pinion ZR, the tooth belt ATA, the deflection rollers UR and UR* and the guide angles FR and FR*, is also provided. These elements are identical to the displacement means VE of the device of FIG. 1 in terms of structure and function. In comparison to the illustrated embodiment of FIG. 1, the tube store RO1 of the embodiment in FIG. 4 has a diameter of the outer tube AR1 which is merely correspondingly enlarged and this of course leads to an adaptation in the case of stranding disk VR1 and the distributor disk TR1.

In further comparison to the embodiment of FIG. 1, the inner tube IR* is likewise enlarged in diameter and comprises a drive having a drive motor MO* which rotates a pinion RZI*. A gear wheel or pinion ZR* is provided in an analogous fashion on the inner tube IR* and is driven by a toothed drive belt AT*. A bearing LI* which is rigidly connected to a frame supports one end of the inner tube or member IR* and is illustrated as being a ball bearing but can also be a common bearing that allows rotation of the tube IR*. Just as with the store RO of FIG. 1, the rotation of the tube or member IR* causes rotation of the entire tube store RO1 because of a connection between the outer tube AR1 and inner tube IR* similar to the splined connection illustrated in FIG. 3. The tube store RO1 has a stranding disk VI12, which is rigidly secured or connected to the inner tube IR* at an end opposite to the pinion ZR*. The stranding disk VI12 is also mounted in the frame by a bearing LV and has two circular arrangements of bores with the outer arrangement of bores being provided for acceptance of a first stranding stock VG1, which is handled by the tube store RO1 and the inner concentric circular arrangement of bores handling a stranding stock VG2, which is stranded by a second tube store RO2 which is received concentrically within the tube store RO1. As illustrated, the stranding disk VI12 may be mechanically coupled to the second tube store RO2 and therefore both tube stores will be driven by a single drive motor such as MO* or MO2.

However, it is also possible to construct the stranding disk VI12 of an inner ring and an outer ring which move relative to each other. The outer ring would be allocated to the stranding stock VG1 and the concentric inner ring would be allocated to the stranding stock VG2 and the two rings would be operated independent of one another, for example, rotate relative to one another due to a bearing inserted therebetween. In this case, the outer ring is connected to the inner tube IR* and the inner ring is connected to a tube AR2 which forms the inner second tubular store RO2. The inner tubular store RO2 has a distributor disk TR2 which is rigidly mounted in the stranding frame and has a bearing such as a roller bearing for supporting the opposite end of the inner tube AR2. The distributor disk TR2 like the distributor disk TR1 has a plurality of bores circumferentially arranged in a circular arrangement in a manner similar to the disk TR1. Thus, this additional stranding stock VG2 is supplied via the bores of the disk TR2 onto the outer surface of the tube AR2 of the second tube store RO2. The motor MO2 is provided to drive the tube store RO2. This is accomplished by a drive pinion ZR2 attached to the shaft of the motor which engages a toothed belt AT2 that engages a drive wheel or pinion ZR2 that is secured onto the end of the second tube AR2.

The second tube store RO2 is illustrated as being hollow and therefore if desired, a central element ZE, for example, a basic bundle that has already been stranded or a tensile core can be introduced through the inside of the tube AR2 of the tube store RO2 with the stranding stock VG2 and the stranding stock VG1 being applied to this central element. As already mentioned, the stranding stock VG2 can expediently be normal leads of an electrical and/or optical cable which are not affected by a backtwist. However, the stranding stock VG1 is a material such as a cable having filling between the inner spaces of the cable element which cable has a high coefficient of friction and therefore does not process with a normal tube store during stranding because of the high frictional drag. The stranding stock VG2 can be stranded with the backtwist, i.e., the leads unwind onto the store without a backtwisting sequence being needed. During the filling of the tube store RO2, thus, the stranding stock VG2 is rolled off onto the tube store and is thus backtwisted. The angle of the belt wrap of the leads is minimized since the diameter of the store is roughly matched to the stranding stock at least given high voltage electrical leads. Since these leads of the stranding stock VG2 have a low coefficient of friction relative to the tube store RO2, this relationship further reduces the rolloff and the stranding of the stock VG2 represents no difficulty.

A control means STE* is provided for actuation of the various drives and controls the operation of the motor MR for the displacement means VE of the tube store RO1, the motor MO* for the drive of the inner tube IR* and the motor MO2 for the drive of the second tube store RO2. The speed and thus the lay numbers for the outer tube store RO1 and for the inner tube store RO2 can be selected to be different, if desired. When stranding cables having filled spacing between the stranded elements, the same speed can also be provided for both tube stores RO1 and RO2 and a shared motor can therefore be utilized for driving both the tube store RO1 as well as tube store RO2. The longitudinal displacement and the return of the tube store RO1 between the initial point A, the reversal point B and the final point C occurs in exactly the same way as the procedure described with regard to the device of FIG. 1.

Instead of utilizing a displacement means VE such as illustrated in FIGS. 1 and 4, other means for longitudinal movement of the tube store RO or, respectively, RO1, can also be utilized. These other means include eccentric drives which are connected to the tube store via connecting rods or correspondingly controlled crank guidances of a known type. An embodiment of the displacement means which function with hydraulic or with compressed air, can also be utilized.

When the discrete drive from the outside through the stranding disk VR of the tube store RO or the stranding disk VR1 of the tube store RO1 is not present, a non-positive or positive connection between the driven inner tube IR and the outer tube AR or the inner tube IR* and the outer tube AR1 are necessary. With this positive connection, other known power transmission means can be utilized for rotating each of the tube stores.

Although various minor modifications may be suggested by those versed in the art, it should be understood that I wish to embody within the scope of the patent granted hereon, all such modifications as reasonably and properly come within the scope of my contribution to the art.

I claim:

1. In a method of SZ stranding for skein-like stock by providing a stranding nipple and a tubular store having an axis, alternately rotating the tubular store on its axis in a first direction and then a second direction and conducting the stock along the outside of the tube store with a changing lay number as the stock moves through the stranding nipple, the improvements comprising reducing the accumulation of backtwist on the stock by moving the tubular store along an axial direction from an initial position through a midpoint to a final position closely adjacent the stranding nipple in a repeating cycle having three portions with the first portion of the cycle moving the tubular store from an initial position to the midpoint and rotating the tubular store in one of the first and second directions to accumulate lays on the tubular store, the second portion of the cycle including reversing the direction of rotation of the tubular store to the other of the first and second directions as the tubular store reaches the midpoint of travel to start to decrease the number of lays accumulated on the tubular store as it moves axially toward the final position and the third portion of the cycle including upon reaching the final position quickly shifting the tubular store in the opposite axial direction to the initial position to repeat the cycle.

2. In a method according to claim 1, wherein the first and second portions of the cycle are of approximately equal duration.

3. In a method according to claim 1, wherein time for accomplishing the third portion is selected to be of significantly shorter duration than the time required for performing each of the first and second portions, preferably the time of the third portion is in a range of one-sixth to one-fifteenth of the time duration for each of the first and second portions.

4. In a method according to claim 1, wherein a time duration for the third portion of each cycle is no more than the time duration for providing one lay on the tubular store during each of the first and second portions.

5. In a method according to claim 1, wherein the step of providing the stranding nipple and the tubular store includes providing a stationary distributor disk and the step of conducting the stock along the outside of the tubular store includes passing the stock through the stationary distributor disk prior to conducting the stock along the outside of the tubular store.

6. In a method according to claim 1, wherein the step of providing a tubular store includes providing a stranding disk attached to an end of the tubular store to rotate therewith, said stranding disk being moved in a longitudinal direction with the tubular store during the axial moving of the tubular store.

7. In a method according to claim 6, wherein the step of providing the tubular store includes providing a second stranding disk, rotating the second stranding disk synchronously with the first-mentioned stranding disk while maintaining the second stranding disk in a substantially fixed longitudinal position adjacent the stranding nipple.

8. In a method according to claim 1, wherein the direction of rotation during the third portion of the cycle is maintained so that the direction of rotation during the first portion of a following cycle is in the same direction as the rotation during the second and third portions of the previous cycle.

9. In a method according to claim 1, wherein the step of providing the tubular store includes providing at least a first and second tubular store with the second tubular store being concentrically received within the first-mentioned tubular store.

10. In a method according to claim 9, wherein the step of rotating each of the tubular stores includes separately rotating each of the tubular stores.

11. In a method according to claim 10, wherein both the first and second tubular stores are operated with longitudinal displacement along the axis of the stores to minimize backtwist of the stranding stock.

12. In a method according to claim 10, wherein the first-mentioned tubular store functions without backtwist and the second tubular store is maintained in a longitudinally fixed position so that backtwist on the stranding stock will occur.

13. In a method according to claim 12, wherein leads on which a backtwist is acceptable are stranded by utilizing the inner, second tubular store and leads on which backtwist is undesirable are placed on the outer first-mentioned tubular store.

14. In a method according to claim 9, wherein both the first-mentioned outer tubular store and the concentrically arranged second inner tubular store are longitudinally displaced along their respective axes during the stranding operation.

15. In an apparatus having a stranding nipple, at least one tubular store having an axis aligned with the axis of the stranding nipple and means for rotating the tubular store in alternate directions about its axis during a stranding operation, the improvements comprising providing means for longitudinally displacing the tubular store along its axis from an initial position spaced from the stranding nipple to a final position adjacent the stranding nipple and then reversing the direction of axial movement to rapidly move from the final position back to the initial position so as to reduce the accumulation of backtwist on the stock as it is conducted along the outside of the tubular store with a changing lay number and then moves through the stranding nipple.

16. In an apparatus according to claim 15, wherein the means for longitudinally displacing the tubular store along its axis between initial and final position controls both the forward feed from the initial position to the final position as well as the return feed from the final position back to the initial position.

17. In an apparatus according to claim 15, wherein a stationary distributor disk for guidance of the stranding stock as it is being provided to the tubular store is provided at an input side of the tubular store.

18. In an apparatus according to claim 17, wherein the distributor disk simultaneously provides a bearing for axial displacement of the tubular store.

19. In an apparatus according to claim 15, wherein the tubular store on an end facing the stranding nipple has a stranding disk mounted for rotation and longitudinal displacement with the tubular store.

20. In an apparatus according to claim 19, wherein a second stranding disk is provided downstream from the tubular store adjacent to the stranding nipple, said second stranding disk being rotated synchronously with the tubular store but being fixed in its position relative to the stranding nipple.

21. In an apparatus according to claim 20, wherein skein-like stranding stock is conducted on a straight line between the first and second-mentioned stranding disks.

22. In an apparatus according to claim 15, which includes a central control means for controlling longitudinal displacement of the tubular store and rotation of said tubular store.

23. In an apparatus according to claim 15, wherein the tubular store has an inner member extending coaxial to an outer tube, said inner member providing axial guide means for the longitudinal movement of the outer member along the axis of the tubular store.

24. In an apparatus according to claim 22, wherein the means for rotating a tubular store engage the inner member, said inner member and outer tubular member having means for transferring rotational motion therebetween so that rotation of the inner member rotates the outer member of the tubular store.

25. In an apparatus according to claim 15, which includes a second tubular store coaxially positioned relative to the first-mentioned tubular store.

26. In an apparatus according to claim 25, wherein the second tubular store is concentrically received within the first-mentioned tubular store, and said first tubular store has a stranding disk movable therewith, said second tubular store being prevented from longitudinal displacement.

27. In an apparatus according to claim 25, which includes separate drive means for rotating each of the tubular stores.

28. In an apparatus according to claim 25, which includes a stranding disk mounted for rotation at a fixed longitudinal position along the axis of the first-mentioned tubular store, said stranding disk having two concentric circles of bores with the outer circle of bores being associated with the first-mentioned tubular store and the inner circle being associated with the second tubular store.

* * * * *